United States Patent [19]

Percival et al.

[11] 3,870,075

[45] Mar. 11, 1975

[54] MIXER TAPS

[75] Inventors: Eric R. Percival, Maidstone; Robert W. Parker, Headcorne, both of England

[73] Assignee: Reed International Limited, London, England

[22] Filed: June 1, 1973

[21] Appl. No.: 366,221

[30] Foreign Application Priority Data
June 20, 1972  Great Britain.................... 28787/72

[52] U.S. Cl................... 137/606, 285/21, 285/286, 285/331
[51] Int. Cl............................................ F16k 19/00
[58] Field of Search.......... 137/606; 285/21, 22, 24, 285/27, 286, 290, 331, 423

[56]  References Cited
UNITED STATES PATENTS

| | | | |
|---|---|---|---|
| 1,257,785 | 2/1918 | Benzinger............................ | 285/331 |
| 1,916,449 | 7/1933 | Tompkins............................ | 285/331 |
| 2,517,391 | 8/1950 | Ernestus.............................. | 285/27 |
| 3,229,710 | 1/1966 | Keller.................................. | 137/606 X |
| 3,238,346 | 3/1966 | Sayko.................................. | 285/21 X |
| 3,394,954 | 7/1968 | Sarns................................... | 285/331 X |
| 3,714,958 | 2/1973 | Johnson............................... | 137/606 X |

FOREIGN PATENTS OR APPLICATIONS 1,216,121  12/1970  Great Britain...................... 137/606

*Primary Examiner*—Robert G. Nilson
*Attorney, Agent, or Firm*—William D. Hall; Fred Philpitt

[57]  ABSTRACT

A mixer tap of the kind comprising a pair of manually operable valve units controlling two flows of fluid to a common outlet spout. A central body unit receives the outlet spout and has two fluid feed ducts, each of which is connected to the outlet of a respective valve unit through a spigot and socket connection. Preferably the body unit and the valve outlets are of plastics material.

7 Claims, 4 Drawing Figures

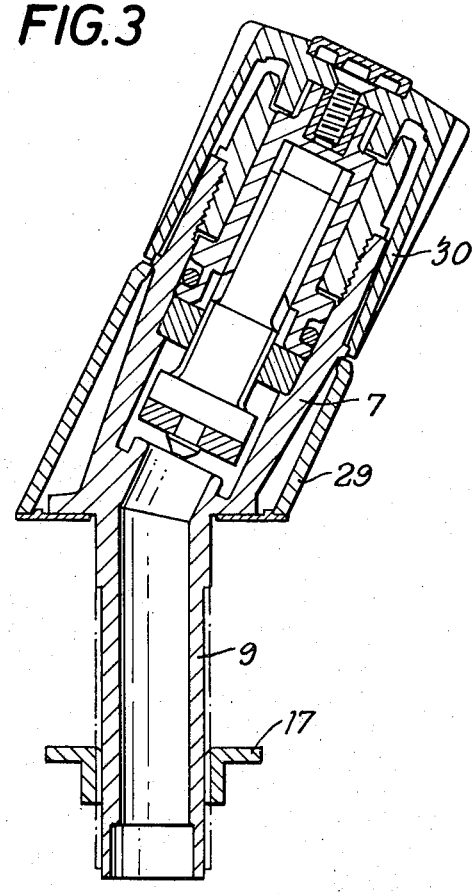

MIXER TAPS

This invention relates to mixer taps of the kind comprising a pair of manually operable valve units controlling two flows of fluid to a common outlet spout.

Advantageously the body unit and valve outlets are of plastics material and are bonded or welded together at the spigot and socket connections. For example dielectric heating may be used to form a weld.

Particularly where the ducts and the valve outlets are of circular cross-section the spigot and socket connections may incorporate inter-engaging lug formations in the manner of dogs to restrain rotation of the body unit relatively to the valve outlets.

The outlet spout may be rotatable relatively to the body unit and be held in the body unit by a shroud ring screwed onto the body unit, the shroud ring having a radial hole for receiving a tommy bar or the like to facilitate tightening or releasing of the shroud ring.

Figure 1:
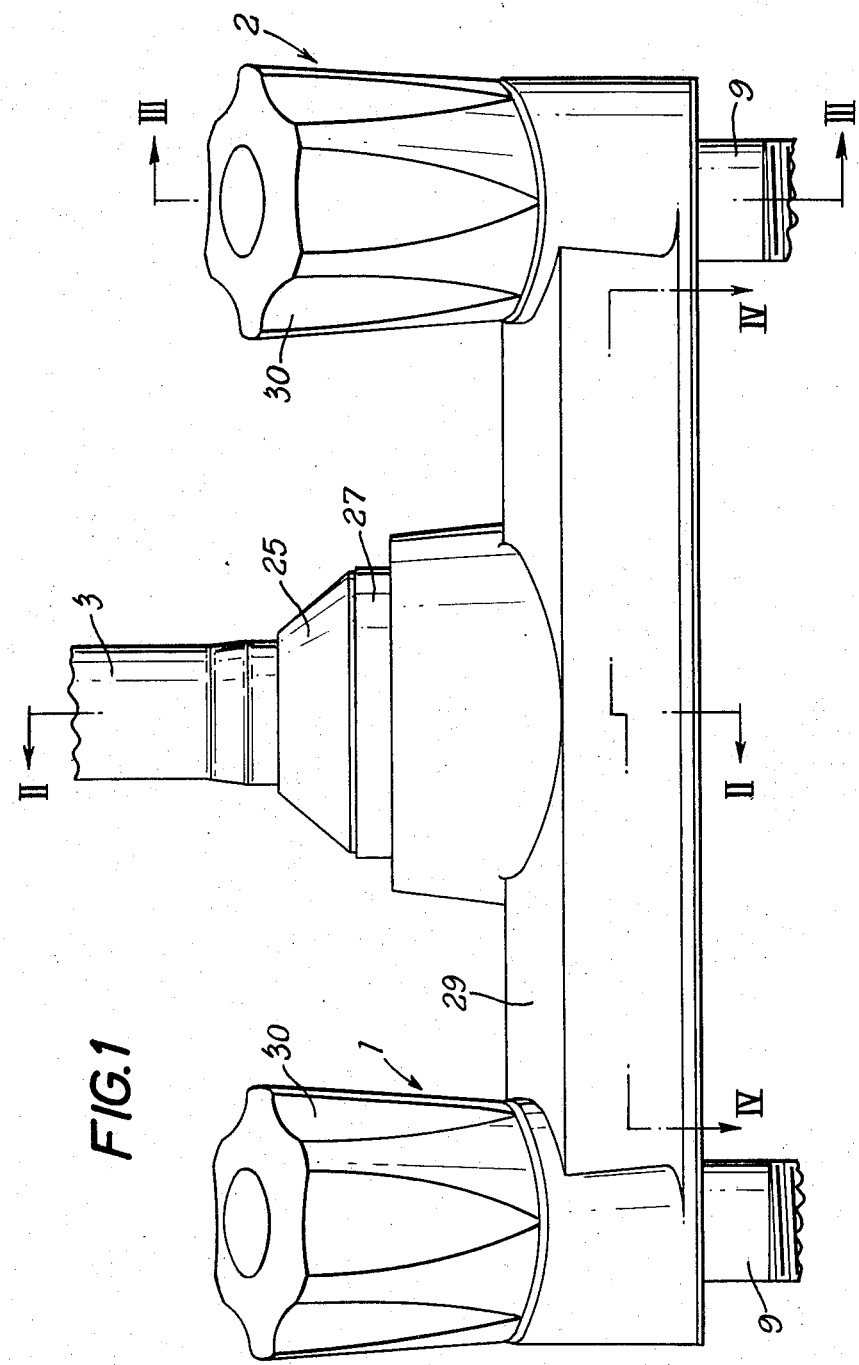
Figure 2:
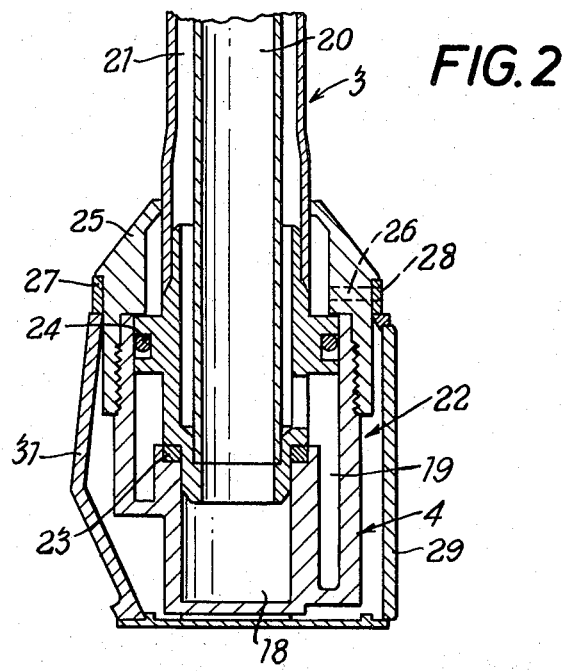
Figure 4:
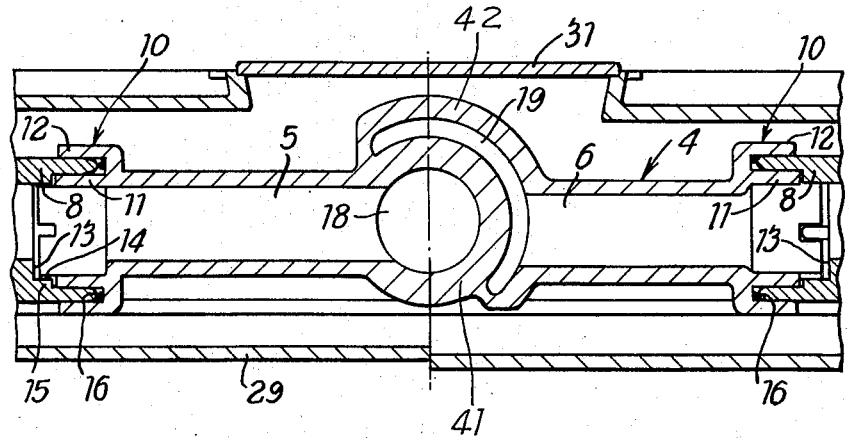

A mixer tap construction in accordance with the invention and for use on a domestic double sink unit will now be fully described by way of example with reference to the accompanying drawings in which:

FIG. 1 is a front elevation of the mixer tap,
FIG. 2 is a section on the line II—II of FIG. 1,
FIG. 3 is a section on the line III—III of FIG. 1 and
FIG. 4 is a section on the line IV—IV of FIG. 1.

The mixer tap comprises a pair of manually operable valve units 1 and 2 controlling the hot and cold water flows to a common outlet spout 3. The construction of the valve units 1 and 2, which are shown in cross-section in FIG. 3, will only be described in this specification as far as it is relevant to the present invention.

The outlet spout is received on a central body unit 4 of moulded plastics construction having hot and cold water inlet ducts 5 and 6 leading from the outlets of valve units 1 and 2. The valve units 1 and 2 have bodies 7 of moulded plastics material and are formed with outlets 8 (FIG. 4) and integral tail or inlet pipes 9 (FIG. 3). The outlets 8 are connected to the inlet ducts 5 and 6 through spigot and socket connections 10. Thus the outer ends of the ducts 5 and 6 are formed with annular sockets defined by inner and outer concentric walls 11 and 12. The ends of the outlets 8 spigot into these sockets up to the shoulders 13. The edge of the inner wall is of a castellated form to provide lugs 14 which inter-engage in the manner of dogs with lugs 15 formed on the inner surface wall of the outlets 8 to restrain relative rotation of the body unit 4 and valve unit outlets 8. The outlets 8 are welded to the inlets 5 and 6 at the spigot and socket connections 10 by high frequency dielectric welding and for this purpose a metal welding ring 16 is located at the closed ends of the sockets. The assembly of the valve units 1 and 2 and the body unit 4 can be secured to a sink unit in known manner by passing the tail pipes 9 through locating holes in the sink unit and screwing on the backing nuts 17.

The two inlet ducts 5 and 6 lead into vertically extending ducts 18 and 19 defined by a central boss portion 22 respectively which maintain separate hot and cold water flows into the outlet spout 3. The duct 18 is defined by wall 41 as a central cylindrical recess in the boss portion 22 and is open at its upper end for connection with the outlet spout 3 and connects at its lower end with the duct 5. The duct 19 is defined between walls 41 and 42 as an arcuate trough partially surrounding duct 18. The trough which is upwardly open communicates through a downward extension 43 with duct 6. The outlet spout has in known manner an inner duct 20 and a surrounding annular duct 21 which connect with the ducts 18 and 19 respectively so that the two water flows do not meet until they reach the outlet of the spout 3.

The outlet spout 3, as can best be appreciated from FIG. 2, is rotatably supported in the boss portion 22 of the body unit 4 containing the ducts 18 and 19 and locates on a washer 23 at the top of wall 41 to seal the ducts 18 and 19 from each other and has an '2' ring seal 24 with wall 42 which extends higher than wall 41. Thus the trough is closed off so that water passing into it can only flow into the duct 21 of the outlet spout. The outlet spout 3 is held in the body unit 4 by a shroud ring 25 which screws on to the boss portion 22. A radial hole 26 is provided in the shroud ring for receiving a tommy bar or the like to facilitate tightening and releasing of the shroud ring 25. A masking ring 27 normally covers the hole 26 and has a hole 28 which when aligned with hole 26 allows insertion of the tommy bar. The ring 27 can be rotated out of alignment to a position in which its hole 28 is not visible.

To provide a pleasing appearance to the final mixer tap assembly, a moulded plastics cover 29 is provided. This cover is designed to be fitted prior to the fitting of the handles 30 of the valve units 1 and 2 and the shroud ring 25 and drops into position over the valve unit bodies 7 and the boss portion 22 of the body unit 4. The cover 29 is trapped in position by the shroud ring 25. To facilitate fitting of the cover 29 which will have to be manipulated to fit over the angled bodies 7 of the valve units 1 and 2, a gap is left in the back of the cover 27 locating behind the boss portion 22 of the body unit 4 and this is finally closed by a cover plate 31 which lips into the cover 29.

We claim:

1. A mixer tap comprising:
   a. a pair of manually operable valve units each having an inlet and outlet duct;
   b. a central body unit formed as a one piece moulding and provided with;
      i. two fluid feed ducts each of which is connected to the outlet duct of one of said valve units through a spigot amd socket connection; and
      ii. a central boss portion defining respective extension ducts to said fluid feed ducts substantially at right angles thereto, one said extension duct extending from an open end centrally into the boss portion and the other extension duct being of trough form partially surrounding said first extension duct and being defined between inner and outer walls of the boss portion, the inner wall of which defines said first extension duct and the outer wall of which is higher than said inner wall, and
   c. an outlet spout having co-axial ducts connected with said extension ducts respectively, the outlet spout sealingly engaging with said inner and outer walls of the boss portion to close the trough constituting said other extension duct.

2. A mixer tap according to claim 1, wherein the body unit and the valve outlets are of plastics material and are bonded or welded together at the spigot and socket connections.

3. A mixer tap according to claim 2, wherein the body unit and the valve outlets are welded together at the spigot and socket connections by high frequency dielectric heating, a metal welding ring being located within each of the spigot and socket connections.

4. A mixer tap according to claim 1, wherein the spigot and socket connections incorporate interengaging lug formations.

5. A mixer tap according to claim 4, wherein the socket of each spigot and socket connection comprises an annular socket defined by inner and outer concentric walls, the edge of the inner wall being castellated to provide lug formations which cooperate with lugs formed on the inner wall surface of the spigot.

6. A mixer tap according to claim 1, wherein the outlet spout is held in the body unit by a shroud ring which screws into the boss portion and abuts against a shoulder on the outlet spout.

7. A mixer tap according to claim 1, wherein a cover fits over the bodies of the valve units and encloses the central body unit.

* * * * *